(12) United States Patent
Boukhtouta et al.

(10) Patent No.: US 11,115,455 B2
(45) Date of Patent: Sep. 7, 2021

(54) TECHNIQUE FOR MONITORING ACTIVITY IN A CONTENT DELIVERY NETWORK UTILIZING GEOHASHING INDEXES

(71) Applicant: TELEFONAKTIEBOLAGET LM ERICSSON (PUBL), Stockholm (SE)

(72) Inventors: Amine Boukhtouta, Montreal (CA); Richard Joseph Brunner, Montreal (CA); Adel Larabi, Pierrefonds (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/055,505

(22) PCT Filed: May 15, 2018

(86) PCT No.: PCT/EP2018/062517
§ 371 (c)(1),
(2) Date: Nov. 13, 2020

(87) PCT Pub. No.: WO2019/219172
PCT Pub. Date: Nov. 21, 2019

(65) Prior Publication Data
US 2021/0227014 A1 Jul. 22, 2021

(51) Int. Cl.
*G06F 15/173* (2006.01)
*H04L 29/06* (2006.01)
*H04L 29/12* (2006.01)

(52) U.S. Cl.
CPC .......... *H04L 65/80* (2013.01); *H04L 61/2503* (2013.01)

(58) Field of Classification Search
CPC ..... H04L 65/80; H04L 43/0852; H04L 43/08; H04L 61/2503; H04L 65/4092;
(Continued)

(56) References Cited

U.S. PATENT DOCUMENTS

2014/0330643 A1* 11/2014 Grigorovici ....... G06Q 30/0267
705/14.52
2015/0180891 A1* 6/2015 Seward ............... H04L 63/1425
726/22
(Continued)

OTHER PUBLICATIONS

International Search Report for PCT/EP2018/062517, dated Nov. 14, 2018; 10 pages.

*Primary Examiner* — Johnny B Aguiar
(74) *Attorney, Agent, or Firm* — Ericsson Inc.

(57) ABSTRACT

A technique for monitoring activity in a content delivery network is disclosed. A method implementation of the technique is performed by a monitoring component associated with the content delivery network and comprises extracting (S302), from one or more event logs of the content delivery network, a plurality of IP addresses and a plurality of events associated with the plurality of IP addresses, obtaining (S304) geolocation information for each of the plurality of IP addresses, generating (S306), for each of the plurality of IP addresses, a geohash based on the geolocation information, grouping (S308) the plurality of IP addresses by their geohash to determine a plurality of geohash groups representative of IP addresses having a same geohash, creating (S310) a geohash index including, for each of the plurality of geohash groups, the geohash of the respective geohash group along with a number of IP addresses included in the respective geohash group and cumulative event information associated with the IP addresses of the respective geohash group, and monitoring (S312) activity in the content delivery network based on the geohash index.

15 Claims, 18 Drawing Sheets

(58) Field of Classification Search
CPC . H04L 63/1441; H04L 63/1408; H04L 67/18;
H04W 4/025; H04W 4/08; H04W 4/021
USPC .................................................. 709/223, 224
See application file for complete search history.

(56) References Cited

U.S. PATENT DOCUMENTS

| | | | |
|---|---|---|---|
| 2015/0264523 A1* | 9/2015 | Xu | ........................... H04L 67/18 |
| | | | 455/456.3 |
| 2016/0253689 A1* | 9/2016 | Milton | ............... G06Q 30/0205 |
| | | | 705/7.34 |
| 2019/0019222 A1* | 1/2019 | Agrawal | ................ G06N 20/00 |
| 2019/0230156 A1* | 7/2019 | McLarty | ............. H04L 67/1014 |

\* cited by examiner

| Attributes | Definition |
|---|---|
| IP | IP address |
| Timestamp | Time representing at what time the event happened |
| HTTP Method | HTTP protocol methods: get, post, head, delete, etc. |
| Object Path | HTTP request path where a web object or video asset is requested |
| HTTP version | HTTP protocol version (usually HTTP 1.1) |
| HTTP Status | HTTP protocol code status: 20X,30X,40X, 50X, etc. |
| Duration | Time taken to deliver requested objects in milliseconds |
| Size | Size of requested data in Bytes |
| Session ID | ID of an authenticated session from where content is requested |
| Referrer | External web referrer to an object |
| Content range | Chunk range when the content is chunked (video case) |
| User agent | Web software signature |
| Operating System | Operating system used by the user agent |
| Browser | Internet browser used by a client |
| Device | Desktop, laptop, or mobile device name |
| Service Type | Type of service (generic HTTP, Video on Demand, etc.) |
| Service category | Static or dynamic service |
| Hit flag | A true or false flag that tells whether requested objects are cached or requested from another tier node |
| Streamer resource name | An edge caching node belonging to a site |
| Streamer site name | A site node where many edge caching nodes are located |
| Network name | The network containing streamer sites |
| Account name | A name of web or video services hosted in the network |
| Account offering | A name of a service type offered under an account |
| Content URL | Requested content URL |
| Content type | Content type: application, image, text, video |
| Fragmentation flag | A flag that tells whether a content is fragmented |

Fig. 1

TECHNIQUE FOR MONITORING ACTIVITY IN A CONTENT DELIVERY NETWORK UTILIZING GEOHASHING INDEXES

TECHNICAL FIELD

The present disclosure generally relates to the field of content delivery networks. In particular, a technique for monitoring activity in a content delivery network is presented. The technique may be embodied in a method, a computer program, an apparatus, and a network.

BACKGROUND

Content delivery networks (CDNs) correspond to geographically distributed networks of servers, typically provided in data centers, that cache and deliver content to users within widespread geographic locations to thereby spatially distribute services to end users with high availability and high performance. An exemplary CDN is Ericsson's Media Delivery Network (MDN) which provides the ability for telecommunication operators to distribute media and content efficiently to customers through their networks and which offers seamless integration of delivery mechanisms aiming to fulfill desired Quality of Service (QoS) requirements.

Services provided by CDNs may comprise video streaming, software downloads, web and mobile content acceleration, transparent caching, load balancing, measuring CDN performance, analytics and protection against cyber-threats, such as distributed denial-of-service (DDoS) attacks, for example. To support services with desired QoS requirements, CDN operators are increasingly interested in the prediction of faulty events, which can be the result of misconfigurations in the CDN, occurrence of unpredictable and problematic network conditions, or the result of cyber-attacks orchestration, for example.

To identify misbehavior, CDN operators may monitor activity in the CDN by investigating event logging data which is collected in near real-time fashion in the CDN. In an event log, events are typically indexed by timestamps in the range of milliseconds, wherein each event usually corresponds to a log of a set of attributes, such as the set of attributes shown in FIG. 1. Although these attributes may constitute a rich source of data when it comes to log analysis, achieving meaningful results can be complex due to the attributes' cardinality (26 attributes in the example of FIG. 1) as well as the presence of qualitative (rather than quantitative) attributes (e.g., IP, User agent, etc.). Especially, given the high cardinality of IP addresses in general leads to a potentially huge number of IP addresses that interact with the CDN (e.g., millions of client IP addresses), wherein monitoring each IP address and the attributes per IP address is a computationally highly complex task.

s Thus, due to the complexity and the heterogeneous nature of the observed events in the collected data, the identification of suspicious patterns or anomalies in the event logging data is comparable to looking for the needle in a haystack, and the prediction of faulty events becomes hardly feasible.

SUMMARY

Accordingly, there is a need for a technique for monitoring activity in a content delivery network which avoids one or more of these, or other, problems.

According to a first aspect, a method for monitoring activity in a content delivery network is presented. The method is performed by a monitoring component associated with the content delivery network and comprises extracting, from one or more event logs of the content delivery network, a plurality of IP addresses and a plurality of events associated with the plurality of IP addresses, obtaining geolocation information for each of the plurality of IP addresses, generating, for each of the plurality of IP addresses, a geohash based on the geolocation information, grouping the plurality of IP addresses by their geohash to determine a plurality of geohash groups representative of IP addresses having a same geohash, creating a geohash index including, for each of the plurality of geohash groups, the geohash of the respective geohash group along with a number of IP addresses included in the respective geohash group and cumulative event information associated with the IP addresses of the respective geohash group, and monitoring activity in the content delivery network based on the geohash index.

The cumulative event information may comprise one or more cumulative event attributes associated with the IP addresses of the respective geohash group. Each of the one or more cumulative event attributes may correspond to one of a number of requests from the IP addresses of the respective geohash group, a content delivery duration average for the IP addresses of the respective geohash group, a content delivery duration standard deviation for the IP addresses of the respective geohash group, a content delivery duration minimum for the IP addresses of the respective geohash group, a content delivery duration maximum for the IP addresses of the respective geohash group, a cache hit ratio indicating a ratio of cache hits to a number of requests from the IP addresses of the respective geohash group, a number of caches serving the IP addresses of the respective geohash group, an entropy of caches indicating a ratio of unique caches to a number of requests from the IP addresses of the respective geohash group, a number of delta bytes indicating a difference between a size of data saved in caches and a size of data requested from the IP addresses of the respective geohash group, an HTTP method ratio indicating a ratio of a HTTP methods counter to a number of requests from the IP addresses of the respective geohash group, an HTTP status ratio indicating a ratio of a HTTP status counter to a number of requests from the IP addresses of the respective geohash group, a presence or number of operator IP addresses among the IP addresses of the respective geohash group, a presence or number of crawler IP addresses among the IP addresses of the respective geohash group, and a presence or number of cyber-threat events associated with the IP addresses of the respective geohash group.

Monitoring activity in the content delivery network may include identifying, from the geohash index, one or more clusters of geohash groups based on a similarity of the plurality of geohash groups in the number of IP addresses included in the respective geohash groups and the cumulative event information associated with the IP addresses of the respective geohash groups. Identifying the one or more clusters may be performed using a density based clustering algorithm. The clustering algorithm may be executed iteratively, wherein at least one non-core cluster of one or more geohash groups may be removed from the geohash index in each iteration until a cardinality of the geohash index falls below a predetermined threshold, and wherein each removed non-core cluster may be added as new cluster to the one or more clusters. Each of the at least one non-core cluster may correspond to a singleton geohash group. The clustering algorithm may be executed under a constraint of at least one of a predetermined minimum distance between clusters of geohash groups and a predetermined minimum number of geohash groups per cluster.

The geohash index may be provided in the form of a matrix comprising the number of IP addresses included in the respective geohash group and the cumulative event information associated with the IP addresses of the respective geohash group as entries which are indexed by the geohash of the respective geohash group. The matrix may be normalized before executing the clustering algorithm. A silhouette score may be calculated in each iteration of executing the clustering algorithm to assess a clustering quality per iteration.

Monitoring activity in the content delivery network may further include creating, from the geohash index, one or more models for analyzing time series data of cumulative event attributes associated with IP addresses of the plurality of geohash groups. Each of the one or more models may be created based on a distinct one of the one or more clusters. Also, analyzing the time series data may comprise at least one of classifying one or more patterns in the time series data, making one or more predictions based on the time series data, identifying one or more repetitive patterns in the time series data, and identifying one or more anomalies in the time series data. At least one of the one or more models may be a machine learning based model and creating the machine learning based model may include profiling time series data of the cumulative event attributes during a machine learning phase. Monitoring activity in the content delivery network may include analyzing live data observed in the content delivery network using the one or more models.

According to a second aspect, a computer program product is provided. The computer program product comprises program code portions for performing the method of the first aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

According to a third aspect, a computing unit for monitoring activity in a content delivery network is provided. The computing unit is configured to execute a monitoring component associated with the content delivery network and comprises at least one processor and at least one memory, wherein the at least one memory contains instructions executable by the at least one processor such that the monitoring component is operable to perform any of the method steps presented herein with respect to the first aspect.

According to a fourth aspect, a content delivery network comprising a computing unit according to the third aspect is provided.

BRIEF DESCRIPTION OF THE DRAWINGS

Various implementations of the technique presented herein are described herein below with reference to the accompanying drawings, in which:

FIG. 1 illustrates exemplary event attributes of an event included in an event log according to the present disclosure;

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 2:
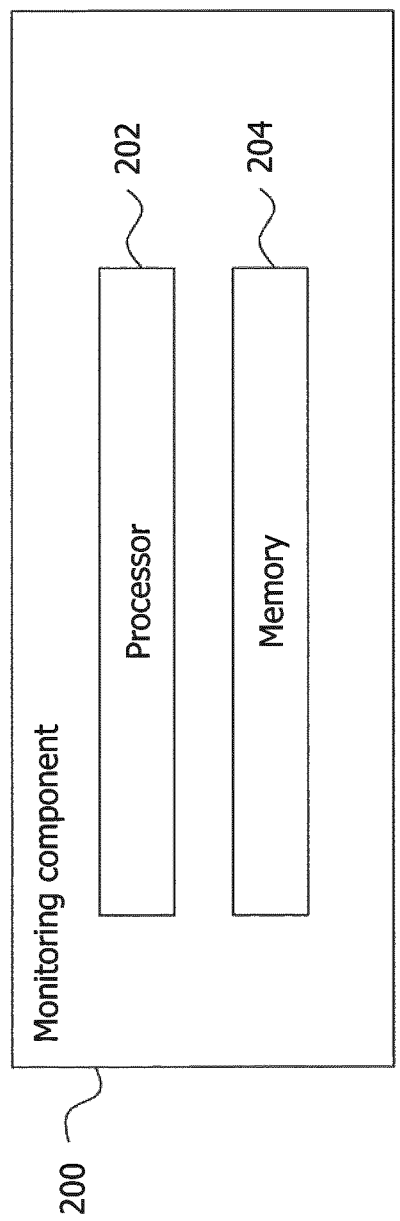
FIG. 2 illustrates an exemplary composition of a computing unit configured to execute a monitoring component according to the present disclosure.

FIG. 2 schematically illustrates an exemplary composition of a computing unit which is configured to execute a monitoring component 200 for monitoring activity in a CDN. The computing unit comprises at least one processor 202 and at least one memory 204, wherein the at least one memory 204 contains instructions executable by the at least one processor 202 such that the monitoring component 200 is operable to carry out the method steps described herein below. It will be understood that the computing unit may be a physical computing unit as well as a virtualized computing unit, such as a virtual machine, for example. It will further be appreciated that the computing unit may not necessarily be implemented as a standalone computing unit, but may be implemented as components—realized in software and/or hardware—residing on multiple distributed computing units as well.

Figure 3A:
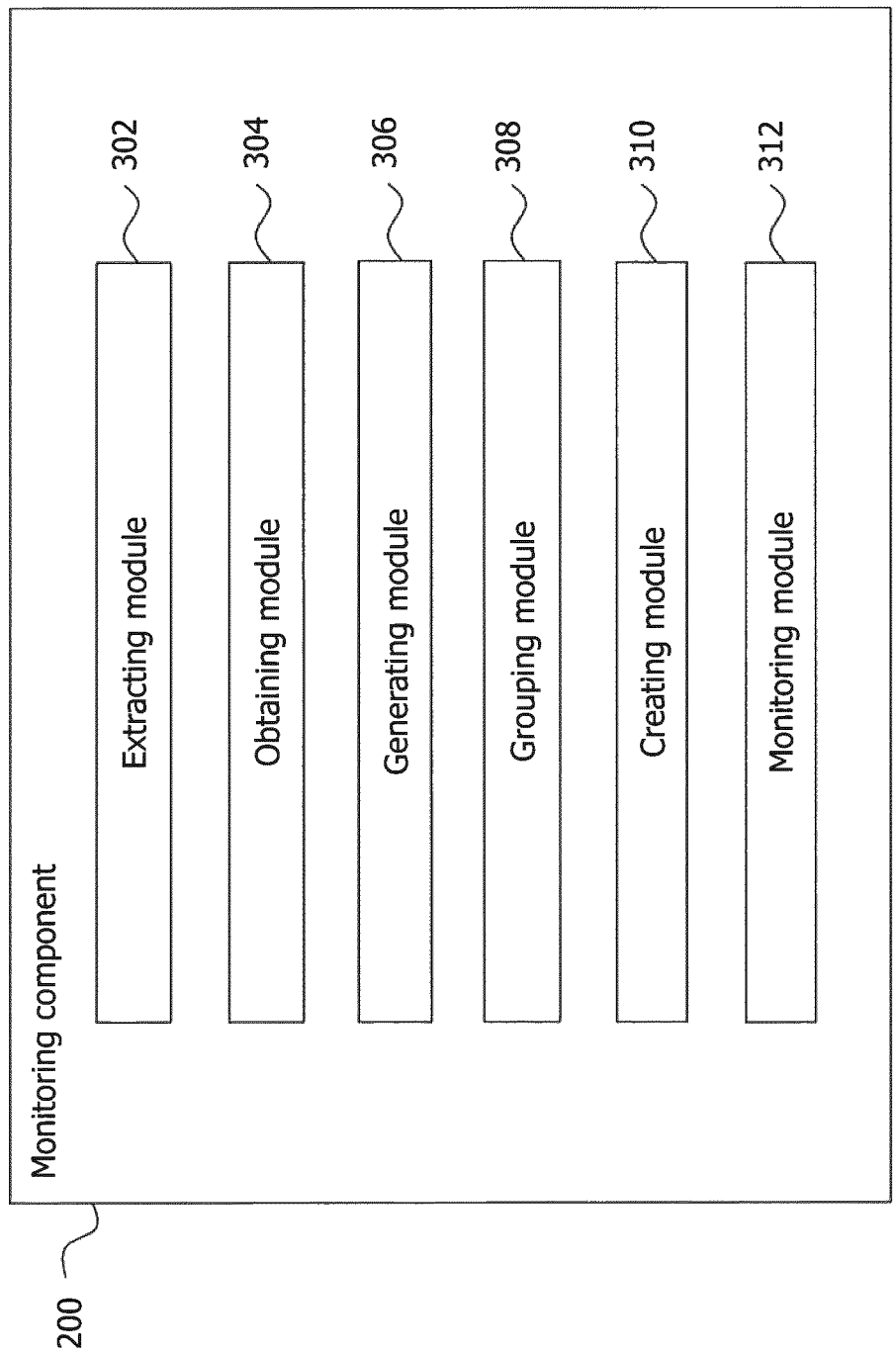
FIGS. 3a and 3b illustrate a modular composition of a computing unit configured to execute a monitoring component according to the present disclosure and a corresponding method which may be performed by the monitoring component.
Figure 3B:
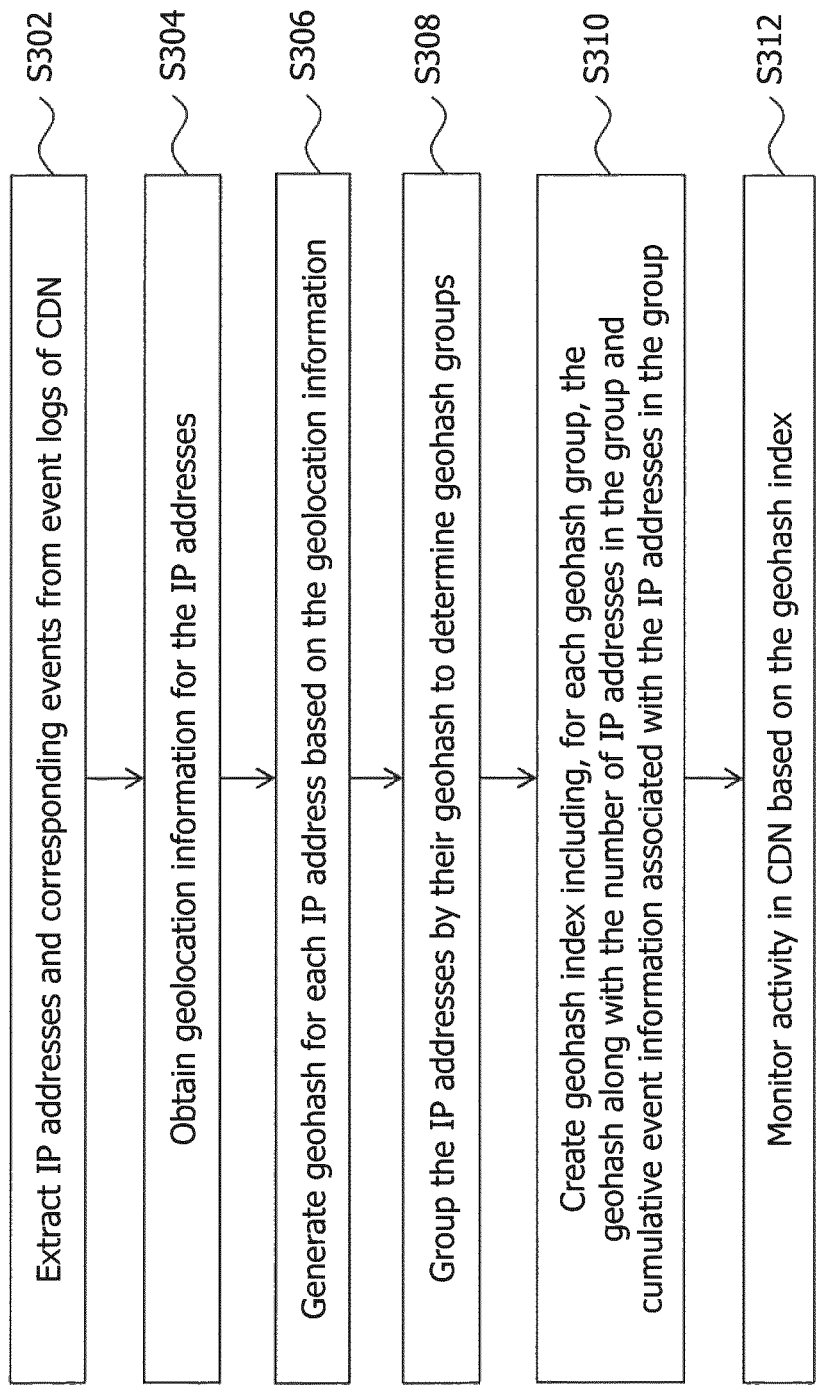

FIG. 3a schematically illustrates an exemplary modular composition of the computing unit which is configured to execute the monitoring component 200 and FIG. 3b illustrates a corresponding method for monitoring activity in the CDN which may be performed by the monitoring component 200. The basic operation of the monitoring component 200 will be described in the following with reference to both FIGS. 3a and 3b.

In step S302, an extracting module 302 of the monitoring component 200 extracts, from the one or more event logs of the CDN, a plurality of IP addresses and a plurality of events associated with the plurality of IP addresses. In step S304, an obtaining module 304 of the monitoring component 200 obtains geolocation information for each of the plurality of IP addresses. In step S306, a generating module 306 of the monitoring component 200 generates, for each of the plurality of IP addresses, a geohash based on the geolocation information. In step S308, a grouping module 308 of the monitoring component 200 groups the plurality of IP addresses by their geohash to determine a plurality of geohash groups representative of IP addresses having a same geohash. In step S310, a creating module 310 of the monitoring component 200 creates a geohash index including, for each of the plurality of geohash groups, the geohash of the respective geohash group along with a number of IP addresses included in the respective geohash group and cumulative event information associated with the IP addresses of the respective geohash group. In step S312, a monitoring module 312 of the monitoring component 200 monitors activity in the CDN based on the geohash index.

The CDN may correspond to a geographically distributed network of servers that cache and deliver content to clients (e.g., end users), wherein the CDN may span over one or more data centers. In the CDN, one or more event logs may be generated to log activity observed in the CDN, such as requests from clients for content (e.g., web content or videos provided through the CDN) and/or requests from entities within the CDN (e.g., nodes of the CDN), for example. "Activity" as referred to herein may be understood in the sense of client activity or request activity, or network activity in more general terms. The one or more event logs may be generated in a single data center or the one or more event logs may be collected from several data centers of the CDN. Each of the one or more event logs may comprise a plurality of events, wherein each event may be indexed by a timestamp (e.g., in milliseconds) and correspond to a log of a set of event attributes. The set of event attributes may at least comprise an IP address associated with the event (e.g., a client IP address of a client requesting content) and further comprise one or more of the event attributes listed in the set of attributes shown in FIG. 1.

As said, in step S302, a plurality of IP addresses as well as a plurality of events (e.g., all events) associated with the plurality of IP addresses may be extracted from the one or more event logs. Each extracted event may comprise all or a portion of event attributes of the event that is stored in the one or more event logs. The plurality of IP addresses and the corresponding plurality of events may be used as ground truth from which information for monitoring activity in the CDN may be derived. According to the technique presented herein, however, rather than monitoring activity in the CDN on the basis of the raw extracted event attributes, i.e., based on the event attributes for each single event log entry and its IP address, a geohash index is created which may be used as informational source for monitoring activity in the CDN.

In order to generate the geohash index from the extracted plurality of IP addresses and the extracted plurality of events, geolocation information for each of the plurality of IP addresses may be obtained in step S304. The geolocation information for an IP address may comprise geographic coordinates including longitude and latitude values associated with the IP address and may be obtained from a geolocation database, for example. Based on the obtained geolocation information, a geohash may be generated for each of the plurality of IP addresses in step S306. As known in the art, a geohash may be obtained from a geocoding system that encodes geographic locations into short strings of alphanumeric symbols. In geohash encoding, the world map may be divided into rectangular cells of fixed longitude and latitude intervals, wherein each geolocation within the same rectangular cell may result in the same geohash value. Details on geohash encoding will be described below with reference to FIGS. 5a to 5d as well as 6a and 6b.

In step S308, the plurality of IP addresses may be grouped by their geohash to determine a plurality of geohash groups representative of IP addresses having the same geohash, i.e., IP addresses whose geolocation is within the same rectangular cell of the geocoding system. For each determined geohash group, the geohash of the geohash group may be stored along with the number of IP addresses in the geohash group and cumulative event information associated with the IP addresses in the geohash group into a geohash index in step S310. The cumulative event information may be generated from the plurality of extracted events by cumulating (e.g., aggregating) plural events among the plurality of extracted events associated with the IP addresses in the geohash group. In other words, the number of distinct IP addresses of the geohash group and cumulative event information associated with the IP addresses of the geohash group may be determined and the corresponding result may be stored in the geohash index. Each calculated pair of a number of IP addresses and corresponding cumulative event information of a geohash group may form an entry of the geohash index, wherein each entry may be indexed by the corresponding geohash. The geohash index may thus correspond to a data set (e.g., a data structure or database) based on which monitoring activity in the CDN may be performed.

As monitoring may be carried out on the basis of a cumulated data set that is accumulated based on geolocation (both in terms of the IP addresses and one or more corresponding event attributes) rather than based on the event attributes of a potentially excessive number of single event log entries and their IP addresses, the complexity of analyzing the observed events may be drastically reduced, in particular with respect to the otherwise given high cardinality of IP addresses. Monitoring may thus be performed on smaller data sets, thereby reducing the computational complexity of monitoring procedures and facilitating the identification of patterns or anomalies in the event data as well as the prediction of faulty events.

The cumulative event information may comprise one or more cumulative event attributes associated with the IP addresses of the respective geohash group. In particular, each of the one or more cumulative event attributes may correspond to one of a number of requests from the IP addresses of the respective geohash group, a content delivery duration average/standard deviation/minimum/maximum for the IP addresses of the respective geohash group (e.g., indicated by content type, such as application, image, text, audio and video), a cache hit ratio indicating a ratio of cache hits to a number of requests from the IP addresses of the respective geohash group, a number of caches serving the IP addresses of the respective geohash group, an entropy of caches indicating a ratio of unique caches to a number of requests from the IP addresses of the respective geohash group, a number of delta bytes indicating a difference between a size of data saved in caches and a size of data requested from the IP addresses of the respective geohash group (e.g., indicated by content type, such as application, image, text, audio and video), an HTTP method ratio indicating a ratio of a HTTP methods counter to a number of requests from the IP addresses of the respective geohash group, an HTTP status ratio indicating a ratio of a HTTP status counter to a number of requests from the IP addresses of the respective geohash group, a presence or number of operator IP addresses among the IP addresses of the respective geohash group, a presence or number of crawler IP addresses among the IP addresses of the respective geohash group, and a presence or number of cyber-threat events associated with the IP addresses of the respective geohash group.

Each of the cumulated event attributes may be computed for a specific time period and may be used for the following exemplary purposes. The number of requests may be used to increase awareness in monitoring and as an indicator to identify crowd events and DDoS attacks, for example. The content delivery duration metrics (average/standard deviation/minimum/maximum) may be used to monitor the delivery time based on type of content (e.g., application, image, text, audio and video). The cache hit ratio may be used to check the efficiency of the caching mechanism. The number of caches may be used to fingerprint caching with respect to IP addresses. The entropy of caches may be used to figure out how caches are redundant vis-à-vis a number of requests from an IP address. The number of delta bytes may be used to monitor the efficiency of the caching mechanism as well. The HTTP method and status ratios may be used to check the frequency of HTTP methods and HTTP status occurrence, in particular with regard to a failure or error status. The presence or number of operator IP addresses may be used to indicate whether (or which portion of) IP addresses belong to the CDN operator or external parties. The presence or number of crawler IP addresses may be used to indicate whether (or which portion of) IP addresses are associated with search engines, and the presence or number of cyber-threat events may be used to indicate whether (or which portion of) IP addresses are related to active or passive cyber-threat events.

Monitoring activity in the CDN based on the geohash index may be implemented in various forms. In one implementation, monitoring activity in the CDN may include identifying, from the geohash index, one or more clusters of geohash groups based on a similarity of the plurality of geohash groups in the number of IP addresses included in the respective geohash groups and the cumulative event information associated with the IP addresses of the respective geohash groups. In this way, clusters of geohash groups which share approximately the same distribution in the number of IP addresses and the cumulative event information may be formed, which may later be used to derive models for analyzing activity observed in the CDN.

In one variant, identifying the one or more clusters may be performed using a density based clustering algorithm, which may be capable of segregating between high, moderate and low density regions in a data set. An example of such density based clustering algorithm may be the well-known DBSCAN algorithm. The clustering algorithm may find core clusters by putting any two core points (i.e., geohash groups) that are within a predetermined radius into the same cluster, wherein border points that are located within a predetermined radius of a core may be put into the cluster as well. In order to identify the one or more clusters, the clustering algorithm may be executed iteratively, wherein at least one non-core cluster of one or more geohash groups may be removed from the geohash index in each iteration until a cardinality of the geohash index falls below a predetermined threshold. Thus, the data set which is used for the algorithm, i.e., the geohash index, may shrink in each iteration. Each removed non-core cluster may be added as new cluster to the one or more clusters. In a particular variant, each of the non-core clusters may correspond to a singleton geohash group (also called "outliers"). Also, the clustering algorithm may be executed under a constraint of at least one of a predetermined minimum distance between clusters of geohash groups and a predetermined minimum number of geohash groups per cluster.

In one particular implementation, the geohash index may be provided in the form of a matrix comprising the number of IP addresses included in the respective geohash group and the cumulative event information associated with the IP addresses of the respective geohash group as entries which are indexed by the geohash of the respective geohash group. This may enable the clustering algorithm to operate on a matrix-based data set. The matrix may be normalized before executing the clustering algorithm, e.g., through a linear or Z-score normalization algorithm. Further, a silhouette score may be calculated in each iteration of the clustering algorithm to assess a clustering quality per iteration. As known to the skilled person, a silhouette score may be a measure indicative of clustering quality, i.e., indicative of how similar an object is to its own cluster compared to other clusters. Silhouette core values may range from $-1$ to $+1$, wherein a high value may indicate that the object is well matched to its own cluster and poorly matched to neighboring clusters. The silhouette score may be recorded in each iteration of the clustering algorithm to make the clustering results verifiable afterwards.

The above-described process of creating the geohash index and performing clustering may represent a first phase of the technique presented herein, the so called "indexing phase". The results of the indexing phase, i.e., the geohash index and, optionally, the clusters computed therefrom may be used as informational source for monitoring activity in the CDN in step S312. Subsequent to the indexing phase, a "learning phase" and a "deployment phase" may follow as part of the activity monitoring. These phases are described in more detail below.

In the learning phase, one or more models for analyzing activity observed in the CDN may be derived. Monitoring activity in the CDN may thus include creating, from the geohash index, one or more models for analyzing time series data of cumulative event attributes associated with IP addresses of the plurality of geohash groups. In particular, each of the one or more models may be created based on a distinct one of the one or more clusters. Each of the one or more clusters may be used to profile temporal data in order to identify profiles, each representing a set of geolocations that share approximately the same distribution of number of IP addresses and cumulative event attributes. Each profile may then be used to derive a model based on which activity in the CDN may later be analyzed, e.g., in terms of the temporal distribution of event attributes, such as the number of requests, content delivery duration metrics, cache hit ratio, number of caches, entropy of caches, number of delta bytes, HTTP method ratio, HTTP status ratio, presence or number of operator IP, crawler IP and/or cyber threat events, as described above.

Analyzing the time series data of cumulative event attributes may comprise at least one of classifying one or more patterns in the time series data, making one or more predictions based on the time series data, identifying one or more repetitive patterns in the time series data, and identifying one or more anomalies in the time series data. At least one of the one or more models may be a machine learning based model and creating the machine learning based model may include profiling time series data of the cumulative event attributes during a machine learning phase.

In the deployment phase, the created models may be used to analyze activity in the CDN. Monitoring activity in the CDN may thus include analyzing live data observed in the CDN using the one or more models. For this purpose, profiles may be extracted from observed live data (e.g., using IP address indexation) to create time series data, which may then be subjected to the one or more models to obtain the desired analysis results, e.g., to detect and/or predict faulty events in the CDN. Based on the analysis results, the monitoring component 200 may trigger one or more actions to resolve the faulty event and/or prevent the faulty event from occurring (e.g., by triggering respective countermeasures). The monitoring component 200 may trigger reconfiguring one or more nodes of the CDN to resolve or prevent the faulty event, for example.

Figure 4A:
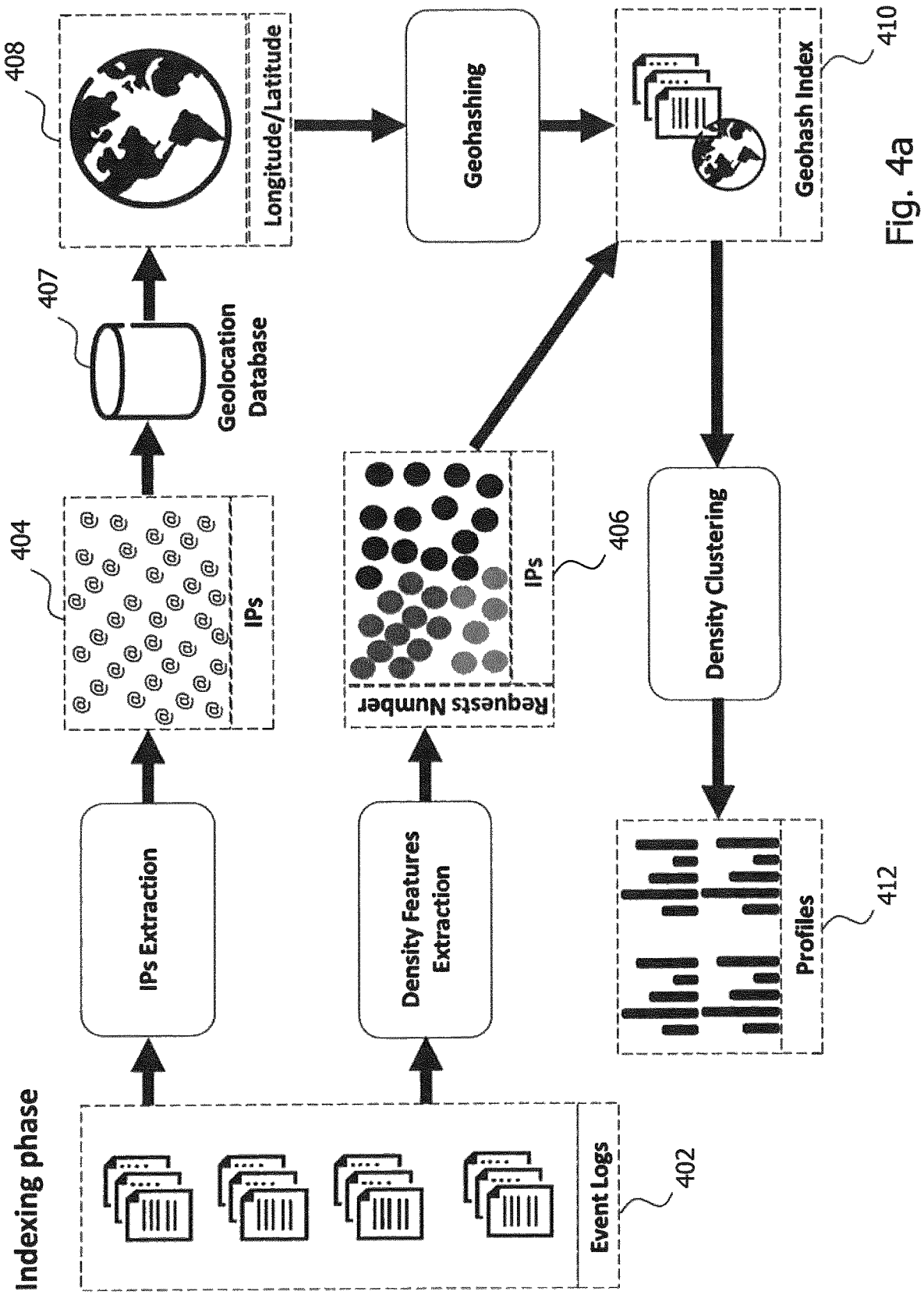
FIGS. 4a to 4c schematically illustrate the indexing phase, the learning phase and the deployment phase of the technique according to the present disclosure.
Figure 4B:
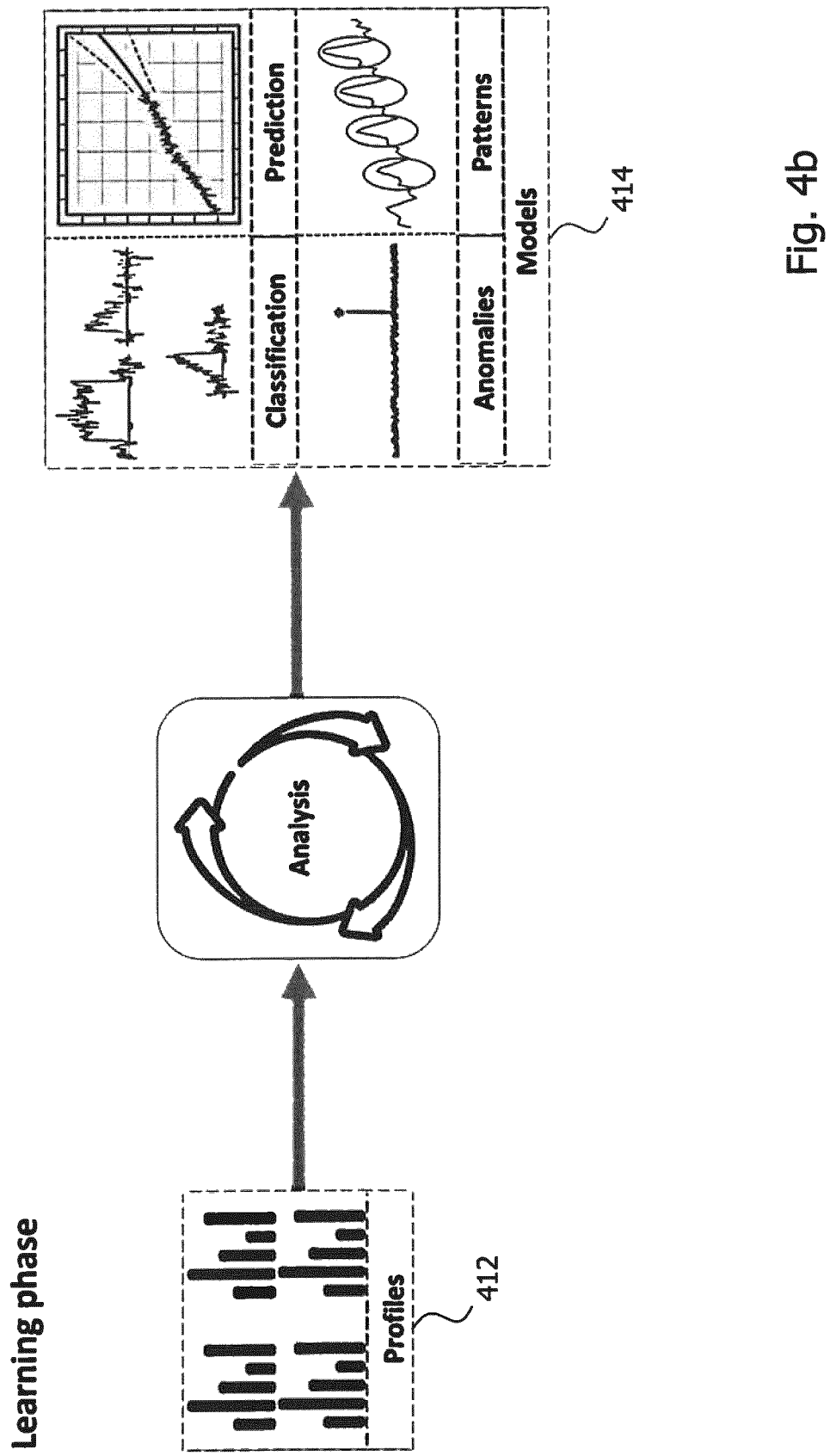
Figure 4C:
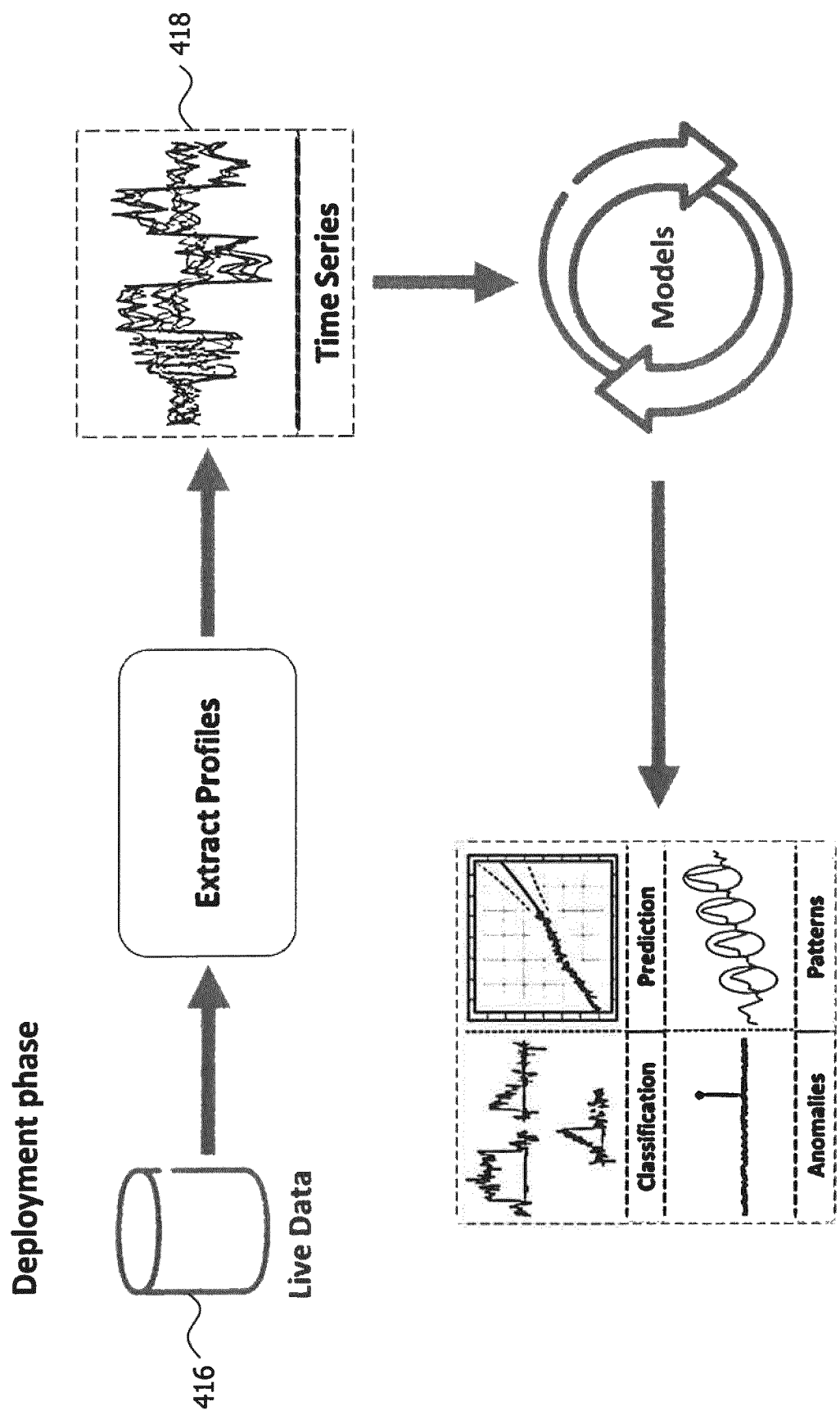

FIGS. 4a to 4c exemplarily illustrate the indexing phase, the learning phase and the deployment phase in more detail. As shown in FIG. 4a, in the indexing phase, event logs 402 may be used to collect relevant data for monitoring activity in the CDN. This may include extracting IP addresses 404 as well as corresponding cumulative event attributes 406 as density features for later use in the density based clustering algorithm. This may correspond to step S302 described above. In the shown example, only the number of requests per IP address are extracted as example of the cumulative event attributes 406. The extracted IP addresses 404 may then be matched with a geolocation database 407 which returns longitude and latitude values as geolocation information 408 associated with each of the IP addresses 404. This may correspond to step S304 described above. Geohashes may then be generated for each of the IP addresses 404 based on the geolocation information 408 and the geohashes may be used to group IP addresses 404 having the same geohash together, as well as their accumulation of event attributes 406, in order to generate geohash groups. Based thereon, a geohash index 410 may be created which maps the geohashes to the corresponding number of IP addresses 404 and cumulative event attributes 406. These actions may correspond to steps S306, S308 and S310 described above. The geohash index, which may be provided in the form of a numerical density matrix, may then be subjected to a density based clustering algorithm to identify clusters of geohash groups. Each cluster may be used to profile temporal data to identify profiles 412, wherein each profile 412 may represent a set of geolocations which share approximately the same distribution of number of IP addresses 404 and cumulative event attributes 406.

In the learning phase shown in FIG. 4b, the profiles 412 may be used to analyze time series data, e.g., in terms of the temporal distribution of the event attributes 406, such as at least one of the number of requests, content delivery duration metrics, cache hit ratio, number of caches, entropy of caches, number of delta bytes, HTTP method ratio, HTTP status ratio, presence or number of operator IP, crawler IP and cyber threat events, as described above. Based on this, one or more models 414 may be derived (e.g., learned using machine learning techniques) which may later be used to monitor activity in the CDN. As shown in FIG. 4b, models can be derived to apply temporal analysis to classify evolving patterns in the time series data, make predictions based on the time series data, identify rare patterns (anomalies) and/or identify repetitive patterns in the time series data, for example.

In the deployment phase shown in FIG. 4c, the created models may be used to analyze activity in the CDN. To this end, profiles may be extracted from observed live data 416 (e.g., using IP address indexation) to create time series data 418, which may then be subjected to the models 414 to obtain desired analysis results, e.g., to predict upper and lower bands for attributes of interest, or to detect abrupt changes, such as a sudden increase or decrease in counters.

Figure 5A:
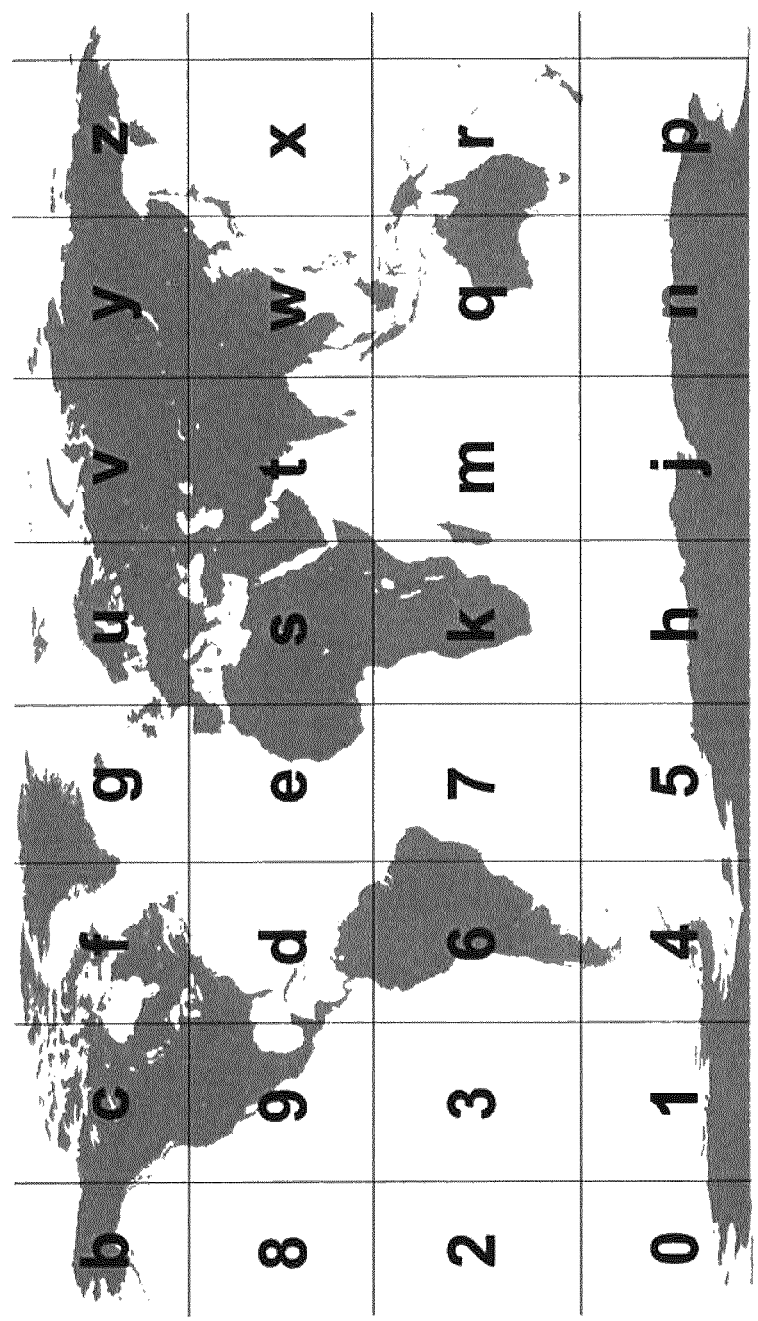
FIGS. 5a to 5d exemplarily illustrate the principle of geohash encoding for precisions 1 to 4.
Figure 5B:
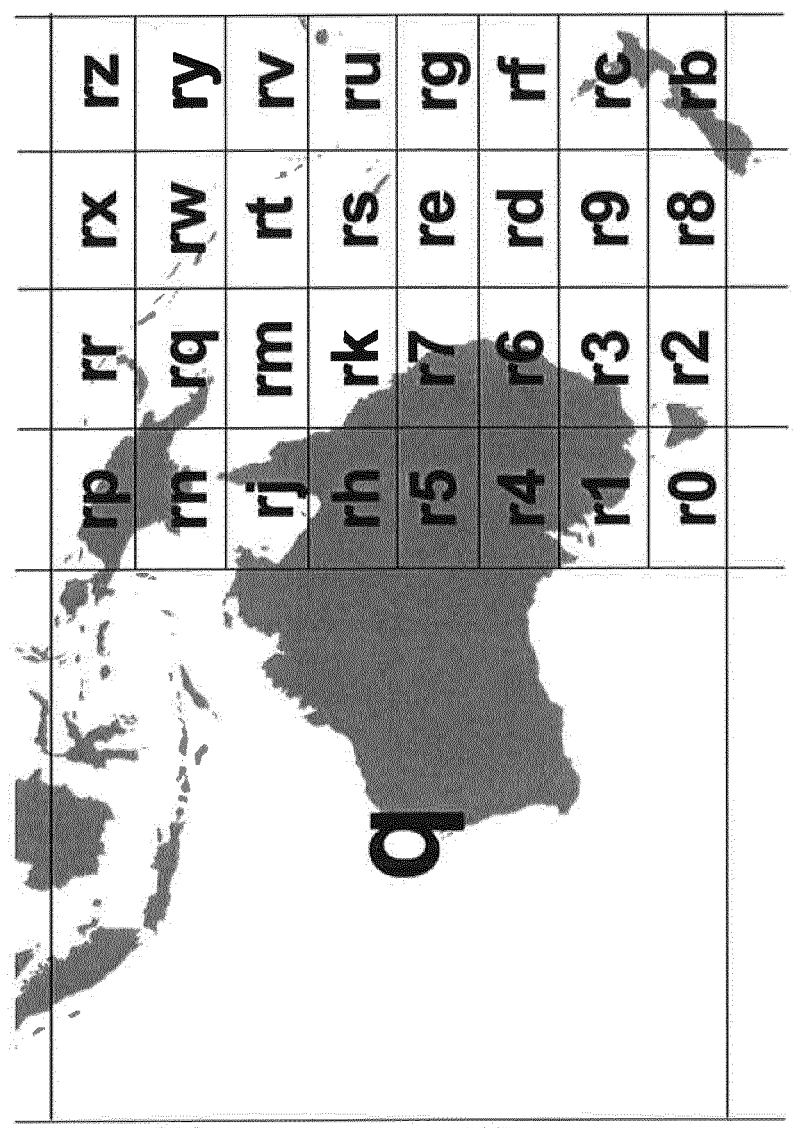
Figure 5C:
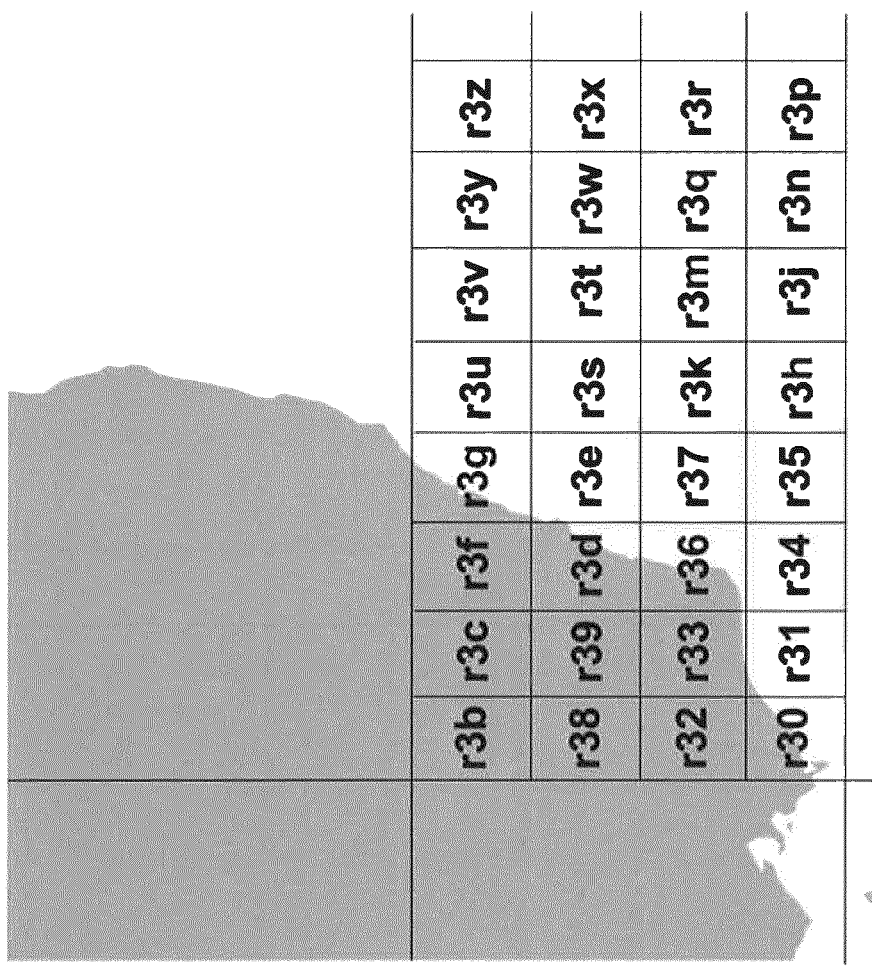
Figure 5D:
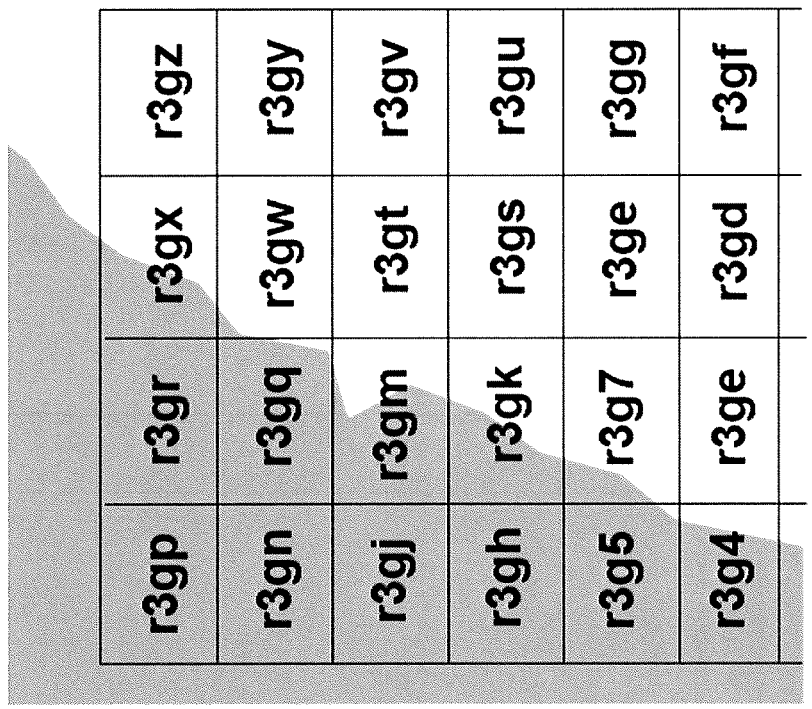
Figure 6A:
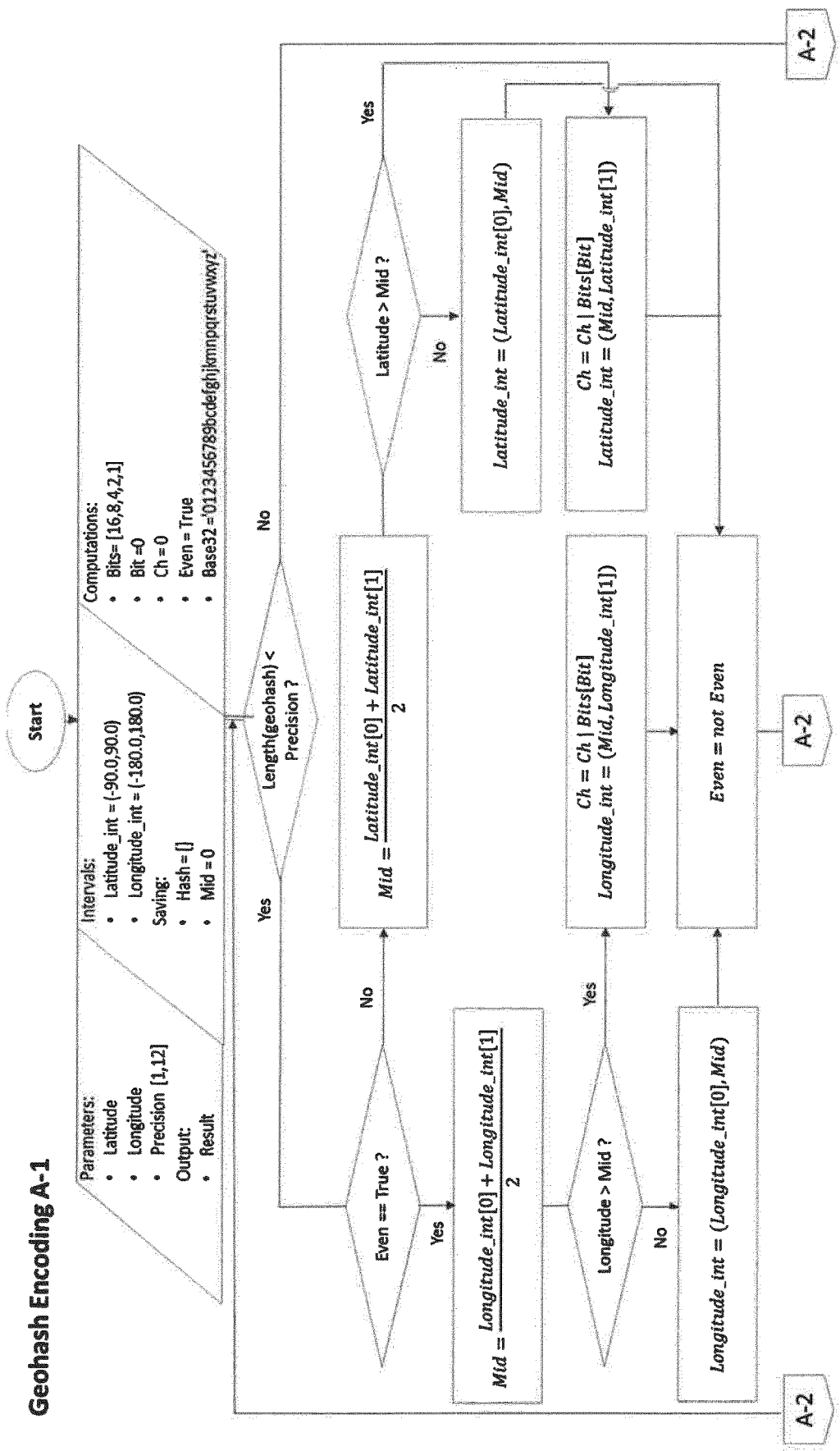
FIGS. 6a and 6b illustrate a flow diagram for an exemplary geohash encoding algorithm.
Figure 6B:
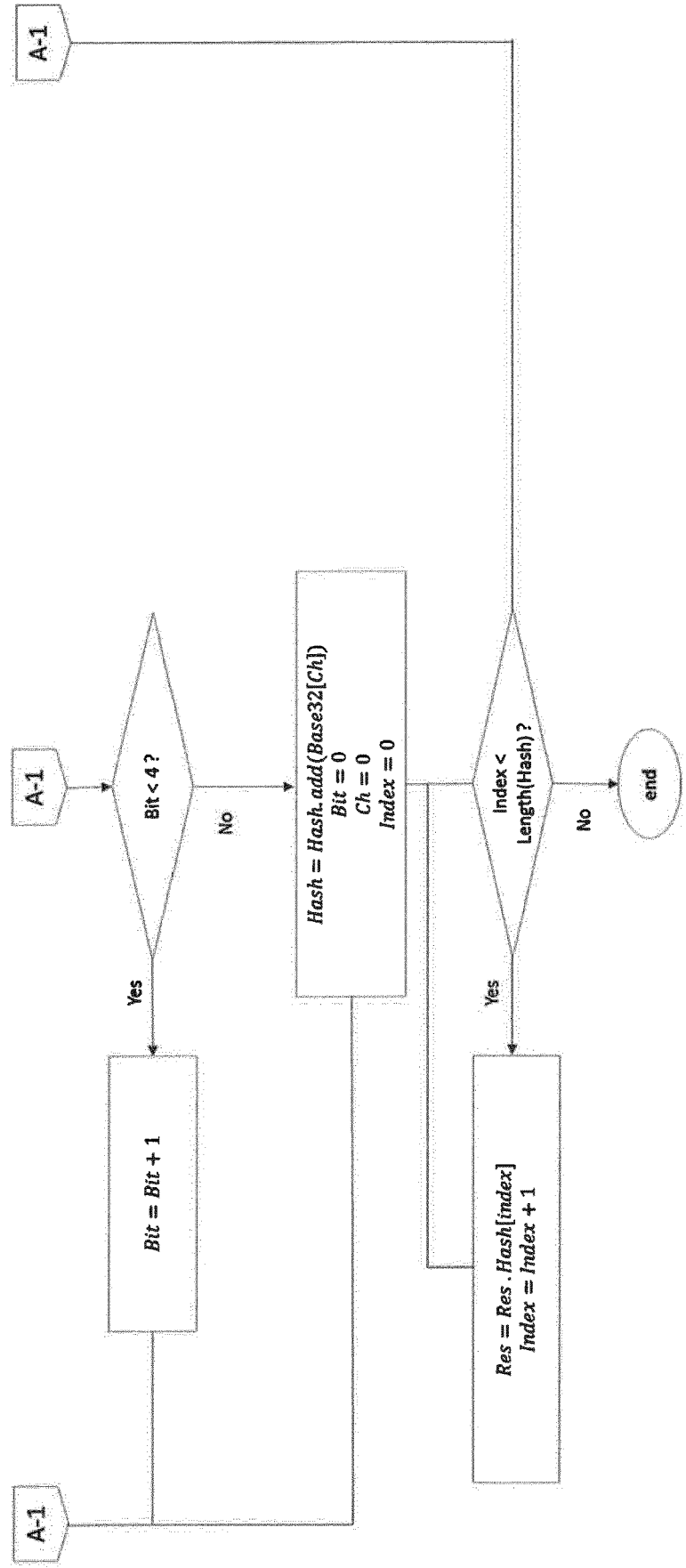

In the following, the principle of geohash encoding will be described with reference to FIGS. 5a to 5d as well as FIGS. 6a and 6b. As shown in FIG. 5a, in geohash encoding, the world map may be divided into rectangular cells of fixed longitude and latitude intervals, wherein each geolocation with the same rectangular cell may result in the same geohash. The geohash itself may correspond to a short string of alphanumeric symbols, the length of which may be determined by a precision parameter (typically precisions are 1 to 12). FIGS. 5a to 5d show exemplary geohash encoding results for precisions 1 to 4 by the example of a region in east Australia. As may be seen, FIG. 5a depicts geohash encoding of precision 1. As may further be seen in FIG. 5b, rectangular cell "r" of FIG. 5a is subdivided into a plurality of subcells, resulting in the rectangular cells of precision 2 shown in FIG. 5b. The same is subsequently applied to FIGS. 5c and 5d, wherein FIG. 5c depicts the subdivision of rectangular cell "r3" of FIG. 5b and FIG. 5d depicts the subdivision of rectangular cell "r3g" of FIG. 5c. It may be seen that each rectangular cell shown in FIG. 5d results in an alphanumeric string of length 4 representing the geohash of precision 4 for the corresponding geographic region. An exemplarily geohash encoding algorithm is illustrated in FIGS. 6a and 6b which uses constants as input, such as longitude and latitude intervals, computation variables to process the computation of hashes, like bits' positions (Bits), encoding symbols (Base32), algorithm control parameters (Bit, Even, Ch) and saving variables (Hash, Mid), for example.

Figure 7:
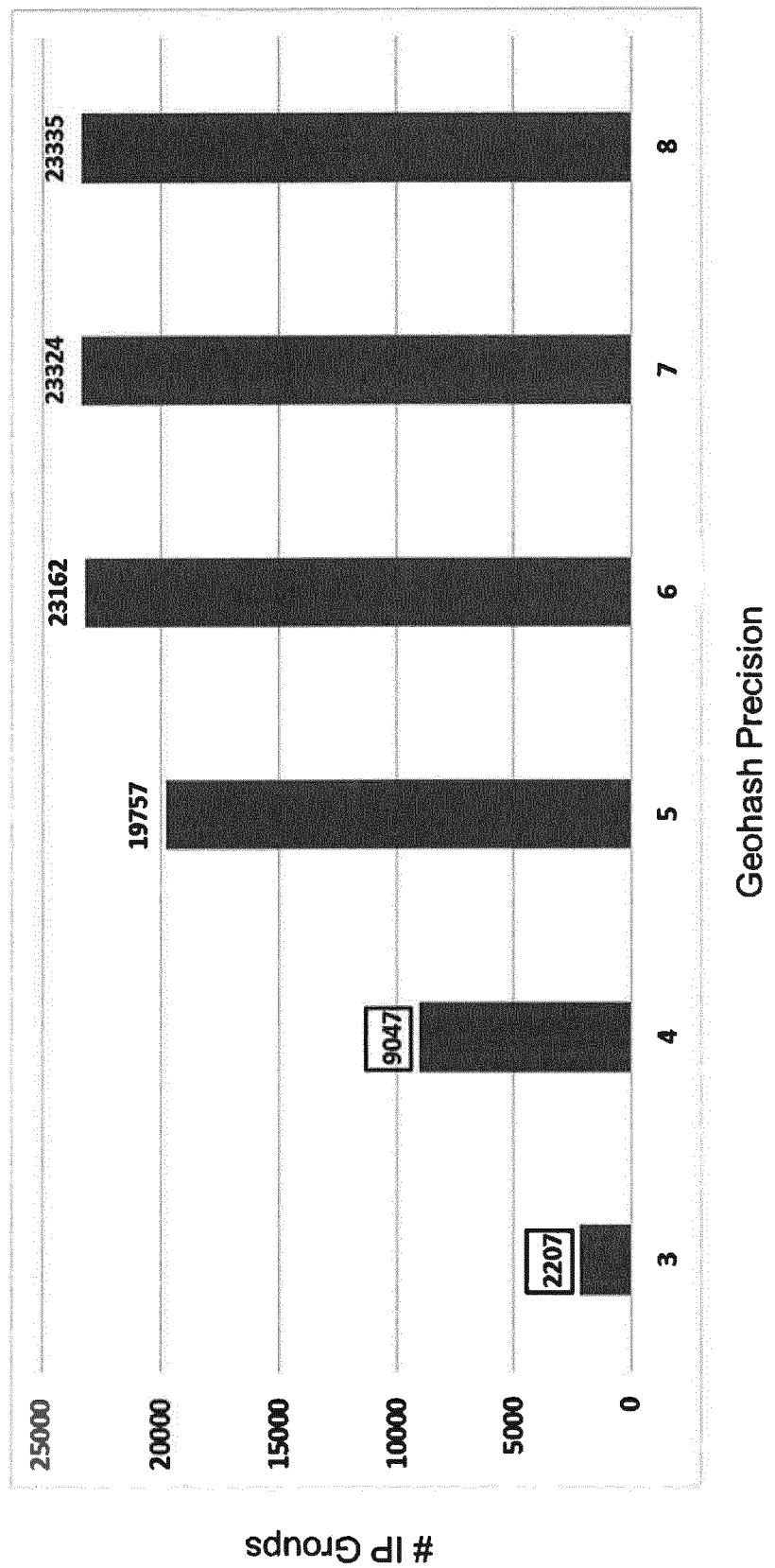
FIG. 7 illustrates a block diagram showing exemplary results of grouping IP addresses by their geohash and a corresponding number of determined geohash groups for different precisions of geohash encoding.

FIG. 7 illustrates a block diagram showing exemplary results of grouping IP addresses by their geohash and the corresponding number of geohash groups for different precisions of geohash encoding. This example is provided to elucidate geohash effectiveness on the grouping of IP addresses. The example is based on real-world data collected from an MDN operator, wherein the number of IP addresses is 1,268,170, which span over 30,634 "/16" subnets located in 219 countries and 15,646 cities. To obtain geolocation indexation of logged events, the subnets were initially considered to group IP addresses in order to reduce complexity with respect to the high cardinality of IP addresses. However, the use of subnets for grouping IP addresses may lead to a loss of the geolocation aspect since many IP addresses may be located within the same subnet and can be geolocated differently. Also, indexing per cities and countries was considered to be prone to be too biased since big cities and countries are not comparable to small cities and countries. It was thus found that geohash encoding with precision 3 or 4 may reduce the number of indexes (i.e., groups) appropriately, as depicted in FIG. 7, in particular with respect to the number of cities (less than 15,646 groups for precisions 3 and 4). Moreover, it was found that geohash encoding with precision 3 or 4 may help to get a more appropriate data source for the creation of profiles that can be used as geolocation (spatial) ground truth for the learning and deployment phase described above.

Figure 8:
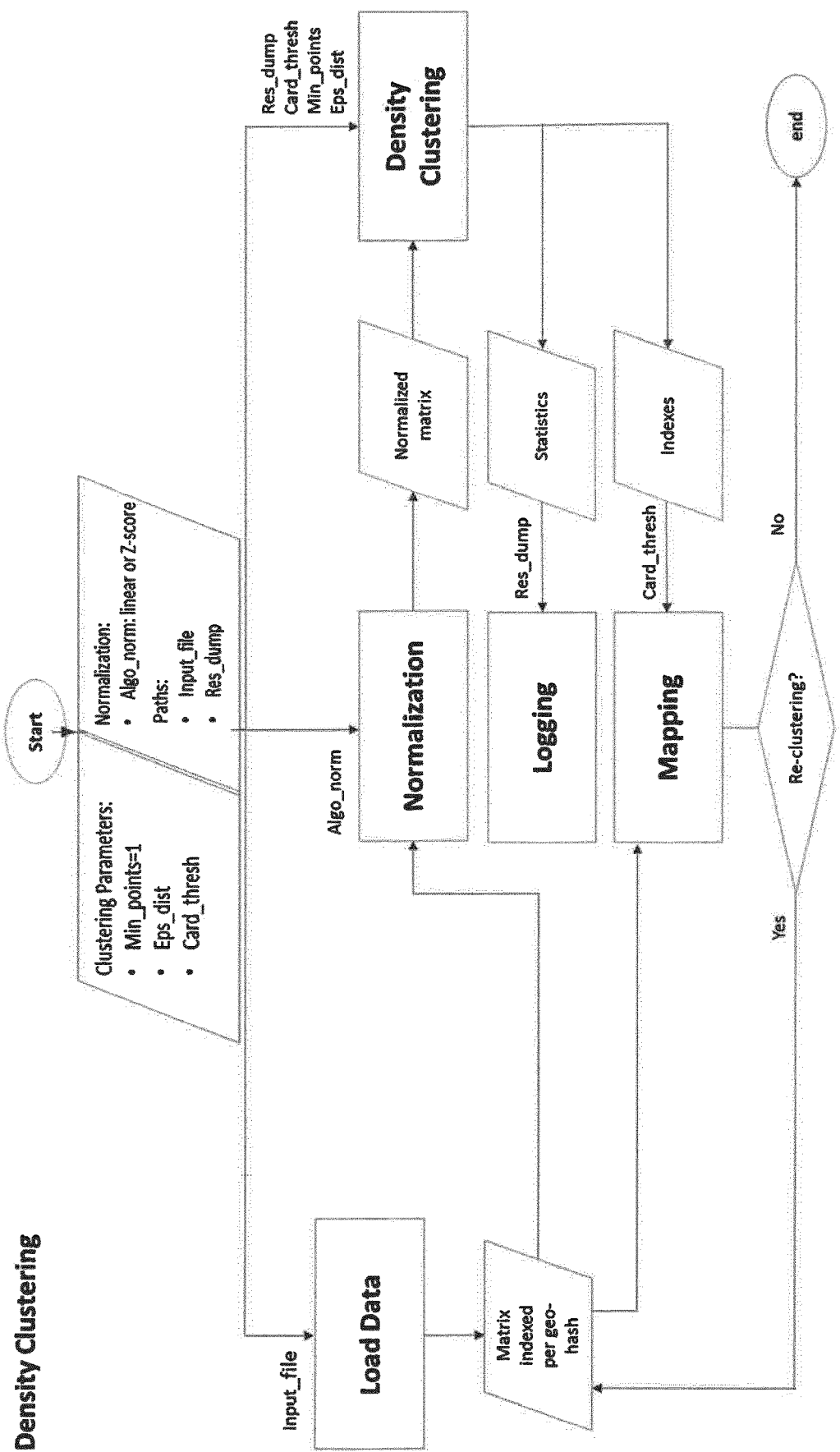
FIG. 8 illustrates an exemplary flow diagram for iteratively executing a density based clustering algorithm according to the present disclosure.
Figure 9A:
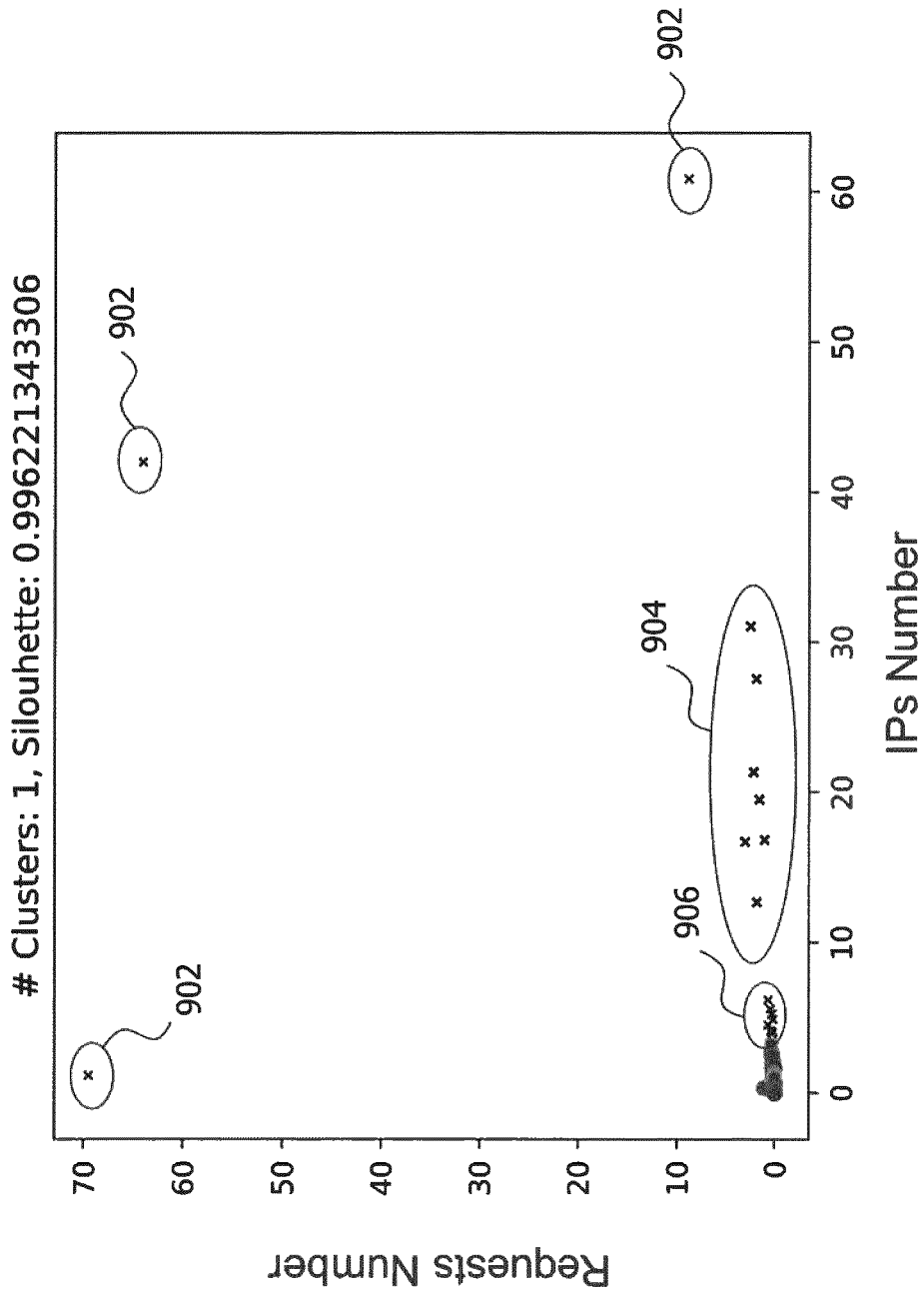
FIGS. 9a to 9c illustrate exemplary clustering results in subsequent iterations of executing the clustering algorithm of FIG. 8.
Figure 9B:
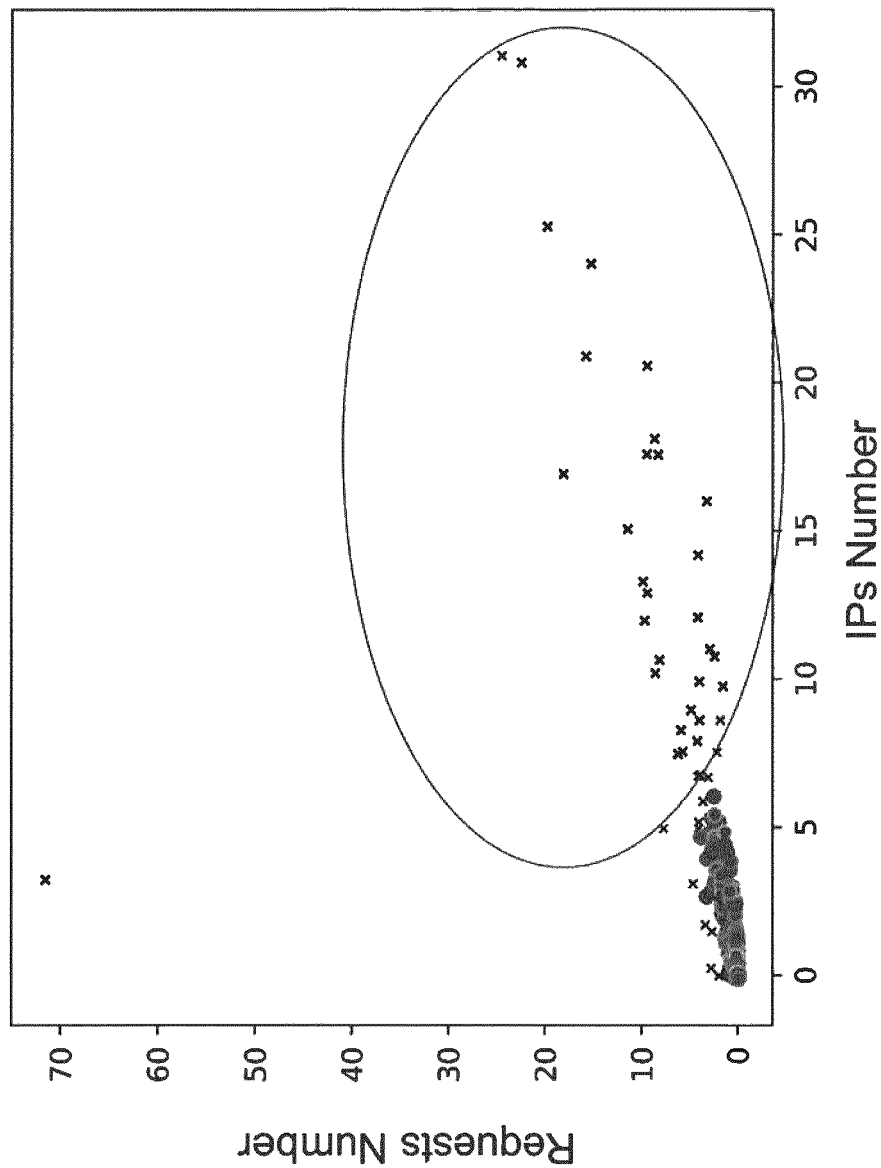
Figure 9C:
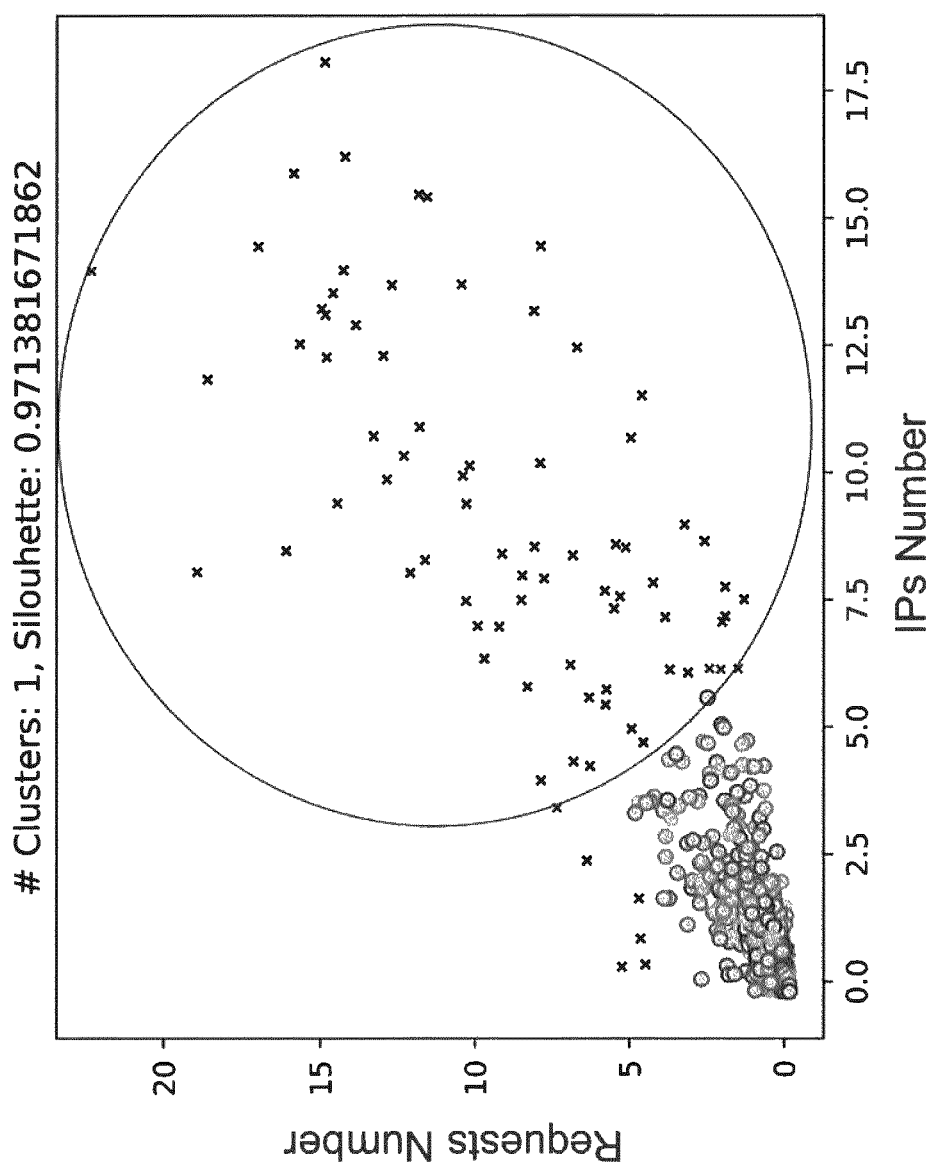

FIG. 8 illustrates an exemplary flow diagram for iteratively executing a density based clustering algorithm and FIGS. 9a to 9c illustrate exemplary clustering results of subsequent iterations of the clustering algorithm. The clustering principle will in the following be described with reference to both FIG. 8 and FIGS. 9a to 9c.

The clustering algorithm may generally aim at clustering geohash groups with approximately the same density in terms of the number of IP addresses and the cumulative event attributes into clusters. To do so, a density based clustering algorithm (e.g., DBSCAN) may be used to assign geohash groups with precision 3 or 4 to clusters. Density clustering may segregate between groups with high, moderate and low density regions in the data set. As shown in FIG. 8, the algorithm may consider a minimum distance (Eps_dist) to cluster geohash groups, a minimum number (Min_points) to create a component for a cluster, and a cardinality threshold (Card_thresh) as parameters to the algorithm. The algorithm may be executed iteratively on two features, namely the number of IP addresses and the cumulative event attributes (which here correspond to the number of requests) indexed per geohash.

At the beginning of the algorithm, information extracted from the event logs may be loaded into an indexed matrix, which may first be normalized through a linear or Z-score normalization algorithm, for example. The clustering algorithm may find core clusters by putting any two core points (i.e., geohash groups) that are within a predetermined radius into the same cluster, wherein border points that are located within a predetermined radius of a core may be put into the cluster as well. The clustering procedure may be executed on the normalized data to extract geohash groups which, in the case of the first iteration of the algorithm (as exemplarily shown in FIG. 9a), may be singleton geohash groups forming non-core clusters 902. The remaining clusters identified in the first iteration are labelled 904 and 906 in FIG. 9a. In shown example, the singletons 902 may be taken as new clusters and their indexes may be removed from the matrix by a corresponding mapping procedure. If the new matrix then has a population higher than the cardinality threshold (e.g., 50%), the clustering may be executed again until a matrix is reached in which the geohash group population is less than the cardinality threshold. Such further iterations are exemplarily depicted in FIGS. 9b and 9c. Further, as shown atop of the diagrams of FIGS. 9a to 9c, a silhouette score may be calculated in each iteration to assess the clustering quality per iteration and the result may be dumped (Res_dump) into a log to make the clustering results verifiable afterwards.

As has become apparent from the above, the present disclosure provides a technique for monitoring activity in a CDN. The technique may be performed by a monitoring component which may be configured to enrich the event logs of the CDN by geolocation information and to profile groups having the same geolocation in terms of their quantitative event attributes. The monitoring component may also be denoted as a "geoprofiler" and may form part of the analytics components of the CDN. The monitoring component may introduce geolocation intelligence as a security asset to monitor activity of clients that access the CDN or nodes of the CDN itself. The technique presented herein may thus be said to be directed to adapting CDNs to support awareness, monitoring, operability and security as built-in assets to identify and rectify faulty events in the CDN. In particular, reduced complexity achieved by overcoming the IP addresses cardinality problem may pave the road toward strengthening real-time awareness and the predictive ability of CDNs.

By enriching the event logs with geohash information to group IP addresses, it may be said that a new space dimension is created within the logs that improves analytics, and the added geo-quantitative feature may help to establish a density analysis for geolocations of IP addresses. The proposed technique may thus also be said to look at CDN activity from both a temporal and a space dimension (i.e., IP addresses, representing a client perspective, for example) and, given a set of timestamp events, temporal and spatial indexes for quantitative attributes may be created to profile event logging data in the CDN.

By using a density based clustering algorithm, clusters of geolocations with approximately the same density in terms of number of IP addresses and cumulative event information may be identified, and the identified clusters can be used to create profiles and predictive models for attributes of interest, such as bandwidth usage, cache hit ratio, number of requests, a HTTP status, a HTTP methods, content (e.g., text, images, audio, video), presence of crawlers, etc. As such, the technique presented herein may be said to represent an approach for identifying geolocation-based clusters of IP addresses to improve operations and detection of abnormal indicators in CDNs.

The technique presented herein may be employed in various use cases, an exemplary selection of which is provided as follows.

As a first use case, the technique presented herein may be employed in a crowd events monitoring scenario. This use case may relate to the identification of network access crowd events. Crowd events may relate to the availability of online assets (e.g., web content illustrating hot news, popular static or streamed videos) that are accessed massively by people, resulting in abrupt changes in bandwidth consumption, number of excess events and increase in the number of accessing IP addresses. Geohash profiles may allow segregating between locations where clients behind IP addresses can trigger a crowd event and locations where IP addresses are not involved in the event.

As a second use case, the technique presented herein may also be employed in a stealthy events monitoring scenario. This use case may relate to the identification of geohash profiles, where IP addresses tend to generate stealthy events to crawl web or media content or to use a HTTP web attacks like a HTTP fuzzing, content injections, or cache deception. Segregating stealthy events from the ones that tend to generate normal to massive events can help to detect potential under radar attacks or crawling events, for example, and may thus ease their mitigation.

As a third use case, the technique presented herein may be employed in DDoS protection, wherein profiling geolocations can help to identify DDoS attacks. A geolocation that tends to follow a certain pattern, where stealthy or moderated access events are observed, can be labeled as a low or moderate activity profile, for example. If a drastic increase in the number of events is observed with respect to this geolocation, an alert can be triggered to quarantine, throttle, or scrub traffic. Also, a challenge mechanism may be set as mitigation to identify human-based access events from bots' ones.

As a fourth use case, the technique presented herein may also be employed in an authorization (legal regulatory access) use case in which content assets (e.g., web content or videos) delivered by the CDN may be legally protected from access from outside the scope of certain geolocations. Profiles may then help to blacklist geolocations that are out of the access scope, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for monitoring activity in a content delivery network, the method being performed by a monitoring component associated with the content delivery network and comprising:
   extracting, from one or more event logs of the content delivery network, a plurality of Internet Protocol (IP) addresses and a plurality of events associated with the plurality of IP addresses;
   obtaining respective geolocation information for each of the plurality of IP addresses;
   generating, for each of the plurality of IP addresses, a geohash based on the respective geolocation information;
   grouping the plurality of IP addresses by respective geohash to determine a plurality of geohash groups representative of IP addresses having a same geohash;
   creating a geohash index including, for each of the plurality of geohash groups, a respective geohash of a respective geohash group along with a number of IP addresses included in the respective geohash group and cumulative event information associated with the IP addresses of the respective geohash group;
   monitoring activity in the content delivery network based on the geohash index; and
   identifying, from the geohash index, one or more clusters of geohash groups based on a similarity of the plurality of geohash groups in the number of IP addresses included in the respective geohash groups and the cumulative event information associated with the IP addresses of the respective geohash groups,
   wherein identifying the one or more clusters is performed using a density based clustering algorithm, wherein the density based clustering algorithm is executed iteratively,
   wherein at least one non-core cluster of one or more geohash groups is removed from the geohash index in each iteration until a cardinality of the geohash index falls below a predetermined threshold, and
   wherein each removed non-core cluster is added as a new cluster to the one or more clusters.

2. The method of claim 1, wherein the cumulative event information comprises one or more cumulative event attributes associated with the IP addresses of the respective geohash group.

3. The method of claim 2, wherein each of the one or more cumulative event attributes corresponds to one of:
   a number of requests from the IP addresses of the respective geohash group,
   a content delivery duration average for the IP addresses of the respective geohash group,
   a content delivery duration standard deviation for the IP addresses of the respective geohash group,
   a content delivery duration minimum for the IP addresses of the respective geohash group,
   a content delivery duration maximum for the IP addresses of the respective geohash group,
   a cache hit ratio indicating a ratio of cache hits to a number of requests from the IP addresses of the respective geohash group,
   a number of caches serving the IP addresses of the respective geohash group,
   an entropy of caches indicating a ratio of unique caches to a number of requests from the IP addresses of the respective geohash group,
   a number of delta bytes indicating a difference between a size of data saved in caches and a size of data requested from the IP addresses of the respective geohash group,
   a Hyper-Text Transfer Protocol (HTTP) method ratio indicating a ratio of a HTTP methods counter to a number of requests from the IP addresses of the respective geohash group,
   an HTTP status ratio indicating a ratio of a HTTP status counter to a number of requests from the IP addresses of the respective geohash group,
   a presence or number of operator IP addresses among the IP addresses of the respective geohash group,
   a presence or number of crawler IP addresses among the IP addresses of the respective geohash group, and
   a presence or number of cyber-threat events associated with the IP addresses of the respective geohash group.

4. The method of claim 1, wherein each of the at least one non-core cluster corresponds to a singleton geohash group.

5. The method of claim 1, wherein the density based clustering algorithm is executed under a constraint of at least one of a predetermined minimum distance between clusters of geohash groups and a predetermined minimum number of geohash groups per cluster.

6. The method of claim 1, wherein the geohash index is provided in as a form of a matrix comprising the number of IP addresses included in the respective geohash group and the cumulative event information associated with the IP addresses of the respective geohash group as entries indexed by the geohash of the respective geohash group.

7. The method of claim 6, wherein the matrix is normalized before executing the density based clustering algorithm.

8. The method of claim 1, wherein a silhouette score is calculated in each iteration of executing the density based clustering algorithm to assess a clustering quality per iteration.

9. The method of claim 1, wherein monitoring activity in the content delivery network includes creating, from the geohash index, one or more models for analyzing time series data of cumulative event attributes associated with IP addresses of the plurality of geohash groups.

10. The method of claim 9, wherein each of the one or more models is created based on a distinct one of the one or more clusters.

11. The method of claim 9, wherein analyzing the time series data comprises at least one of:
   classifying one or more patterns in the time series data,
   making one or more predictions based on the time series data,
   identifying one or more repetitive patterns in the time series data, and
   identifying one or more anomalies in the time series data.

12. The method of claim 9, wherein at least one of the one or more models is a machine learning based model and creating the machine learning based model includes profiling time series data of the cumulative event attributes during a machine learning phase.

13. The method of claim 9, wherein monitoring activity in the content delivery network includes analyzing live data observed in the content delivery network using the one or more models.

14. A non-transitory computer readable media comprising instructions for monitoring activity in a content delivery network, the instructions being executable by a monitoring component associated with the content delivery network, the instructions comprising:

extracting, from one or more event logs of the content delivery network, a plurality of Internet Protocol (IP) addresses and a plurality of events associated with the plurality of IP addresses;

obtaining respective geolocation information for each of the plurality of IP addresses;

generating, for each of the plurality of IP addresses, a geohash based on the respective geolocation information;

grouping the plurality of IP addresses by respective geohash to determine a plurality of geohash groups representative of IP addresses having a same geohash;

creating a geohash index including, for each of the plurality of geohash groups, a respective geohash of a respective geohash group along with a number of IP addresses included in the respective geohash group and cumulative event information associated with the IP addresses of the respective geohash group;

monitoring activity in the content delivery network based on the geohash index; and identifying, from the geohash index, one or more clusters of geohash groups based on a similarity of the plurality of geohash groups in the number of IP addresses included in the respective geohash groups and the cumulative event information associated with the IP addresses of the respective geohash groups, wherein identifying the one or more clusters is performed using a density based clustering algorithm, wherein the density based clustering algorithm is executed iteratively, wherein at least one non-core cluster of one or more geohash groups is removed from the geohash index in each iteration until a cardinality of the geohash index falls below a predetermined threshold, and wherein each removed non-core cluster is added as a new cluster to the one or more clusters.

15. A computing unit for monitoring activity in a content delivery network, the computing unit being configured to execute a monitoring component associated with the content delivery network and comprising at least one processor and at least one memory, the at least one memory containing instructions executable by the at least one processor, the instructions comprising:

monitoring activity in a content delivery network, the code portions being executed by a monitoring component associated with the content delivery network and comprising instructions for:

extracting, from one or more event logs of the content delivery network, a plurality of Internet Protocol (IP) addresses and a plurality of events associated with the plurality of IP addresses;

obtaining respective geolocation information for each of the plurality of IP addresses;

generating, for each of the plurality of IP addresses, a geohash based on the respective geolocation information;

grouping the plurality of IP addresses by respective geohash to determine a plurality of geohash groups representative of IP addresses having a same geohash;

creating a geohash index including, for each of the plurality of geohash groups, a respective geohash of a respective geohash group along with a number of IP addresses included in the respective geohash group and cumulative event information associated with the IP addresses of the respective geohash group;

monitoring activity in the content delivery network based on the geohash index; and identifying, from the geohash index, one or more clusters of geohash groups based on a similarity of the plurality of geohash groups in the number of IP addresses included in the respective geohash groups and the cumulative event information associated with the IP addresses of the respective geohash groups, wherein identifying the one or more clusters is performed using a density based clustering algorithm, wherein the density based clustering algorithm is executed iteratively, wherein at least one non-core cluster of one or more geohash groups is removed from the geohash index in each iteration until a cardinality of the geohash index falls below a predetermined threshold, and wherein each removed non-core cluster is added as a new cluster to the one or more clusters.

* * * * *